Dec. 12, 1967 E. BIANCHI 3,357,440
DISHWASHING MACHINE WITH DOUBLE RELATIVE
MOTION BETWEEN CLEANSING
SPOUTS AND DISHES
Filed Aug. 2, 1965 3 Sheets-Sheet 3

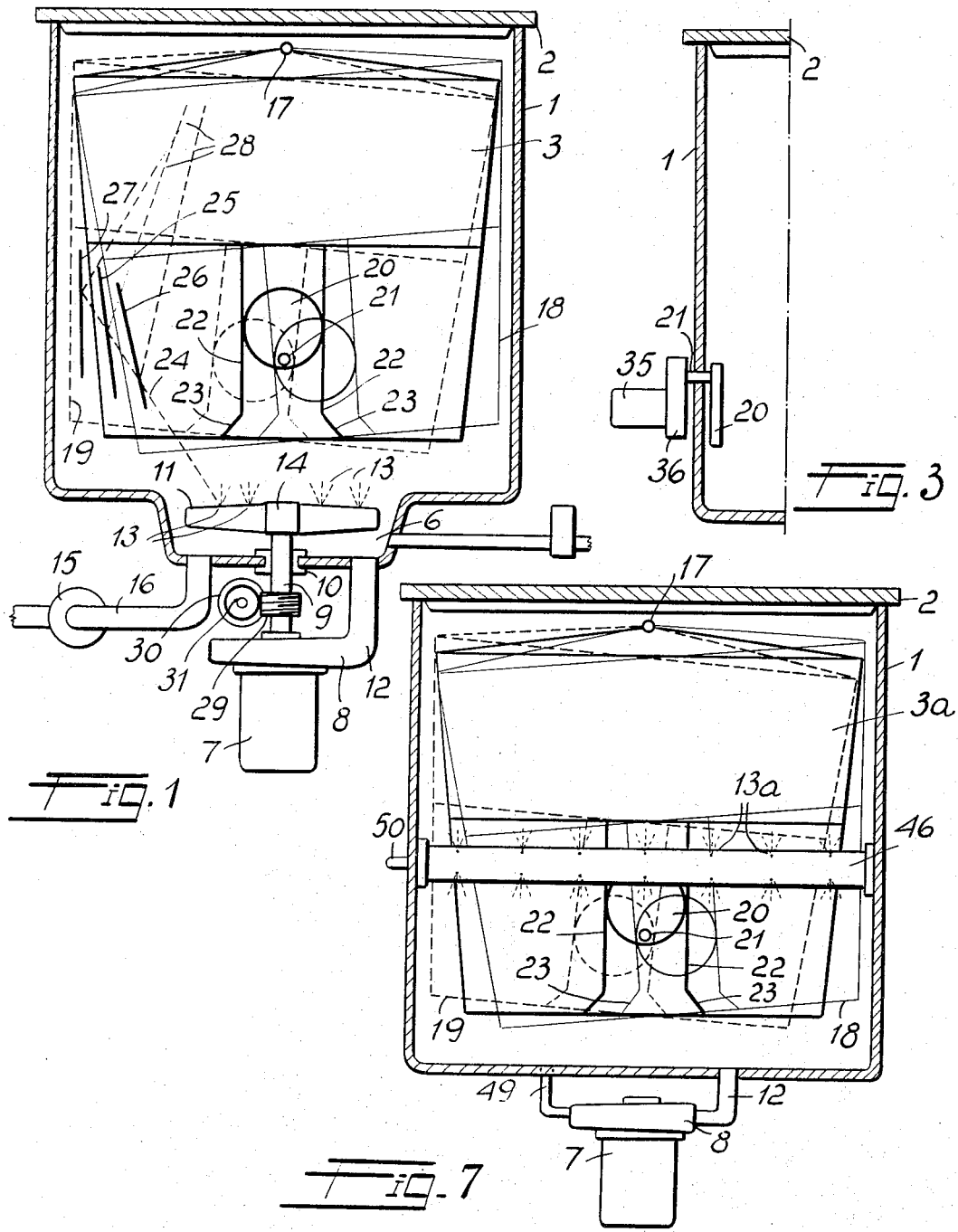

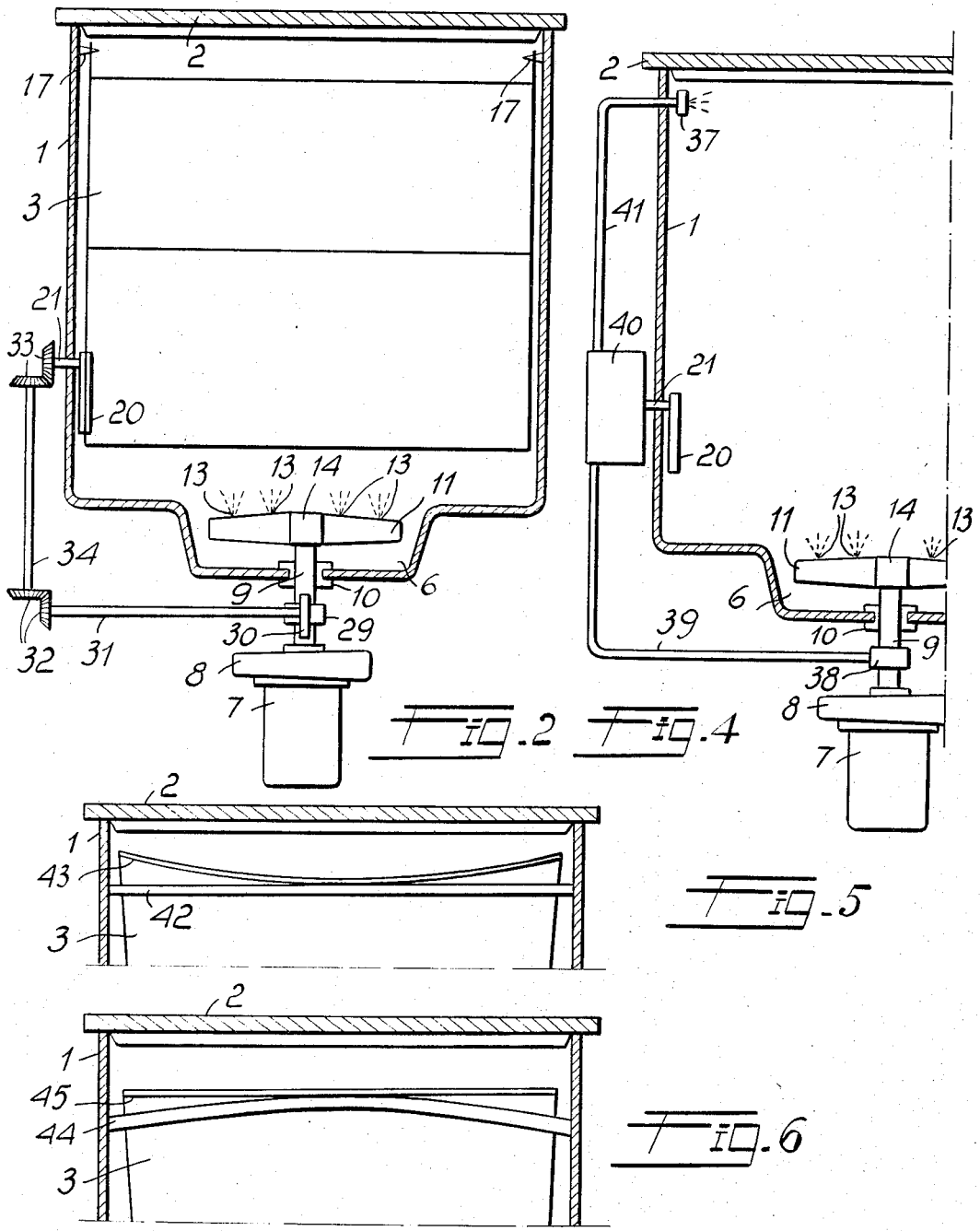

INVENTOR.
EUGENIO BIANCHI
BY Young + Thompson
ATTYS.

United States Patent Office 3,357,440
Patented Dec. 12, 1967

3,357,440
DISHWASHING MACHINE WITH DOUBLE RELATIVE MOTION BETWEEN CLEANSING SPOUTS AND DISHES
Eugenio Bianchi, Viale Vittorio Emanuele 39, Bergamo, Italy
Filed Aug. 2, 1965, Ser. No. 476,300
Claims priority, application Italy, Dec. 19, 1964, 27,115/64
5 Claims. (Cl. 134—140)

ABSTRACT OF THE DISCLOSURE

A dishwashing machine has at least one basket for supporting dishes, the basket being suspended for oscillatory movement. Jets for impinging cleaning fluid on the dishes are movable in a closed path. Means are provided for swinging the basket and moving the jets, with different frequencies, so that the cleaning fluid will impinge on the dishes at continuously different angles.

---

The present invention relates to improvements in dishwashing machines of the type including one or more baskets destined to support the dishes, suitably arrange and sustained by appropriate projections on the basket itself, in order to maintain every dish firm and separate from the others, as well as one or more water spouts, however generated and oriented, destined to strike against the dishes for the cleansing action, the water being usually warmed, and containing a cleansing substance so that the washing occurs both by mechanical and chemical action.

In these known types of dishwashers, in order to make sure that all the portions of every dish be sufficiently washed, it is provided that between the basket containing the dishes and the group of water spouts or sprays there be a relative movement, that is the basket with the dishes remains stationary while the water spouts unit rotates about an axis conveniently disposed relative to the dishes to be washed, or else the dish basket rotates while the water spouts unit arranged inside and outside of the rotating basket is stationary.

However, with either arrangement, at each washing cycle, each dish portion is struck by the water sprays at the same angles, whereby in certain dish position, that cannot be foreseen and determined beforehand, it may occur occasionally that some dishes, or at least some parts thereof, will be sprinkled but not struck by the water with the energy sufficient to assure a good washing.

It is an object of the present invention to obviate the inconveniences considered above, practically reducing to nothing the likelihood that in the washing tank might be generated blind angles wherein the water arrives without the necessary pressure, whereby all the surfaces and all the parts of the dishes loaded in the machine are struck by the washing water so as to make sure of the complete removal of every residue of food or seasoning from the dishes themselves.

More exactly, in a dishwasher according to the present invention, between the dish carrying basket and the washing spouts there will be two relative movements and namely, in addition to the relative rotary movement of the water spouts unit in respect to the dish carrying basket or baskets, an oscillatory movement of one of these assemblies relative to the other one, such oscillatory movement having a frequency such as to make sure that during successive cycles of said relative rotation the dishes are always struck by the water spouts at different impact angles so as to obtain a more complete and efficient washing of the dishes themselves.

The accompanying drawings illustrate schematically and in the way of a non limiting example, some ways of practical embodiments of dishwashers according to the present invention, and namely:

FIGS. 1 and 2 are two vertical sections, taken along planes perpendicular to each other, of one type of dishwasher.

FIGS. 3 and 4 show, in vertical sections, two variants of the oscillatory movement actuation, in respect to that of FIGS. 1 and 2.

FIGS. 5 and 6 illustrate schematically two variants of the basket suspension system, relative to the one of FIG. 1.

FIGS. 7 and 8 illustrate schematically another embodiment of a dishwasher according to the invention.

Figure 8:
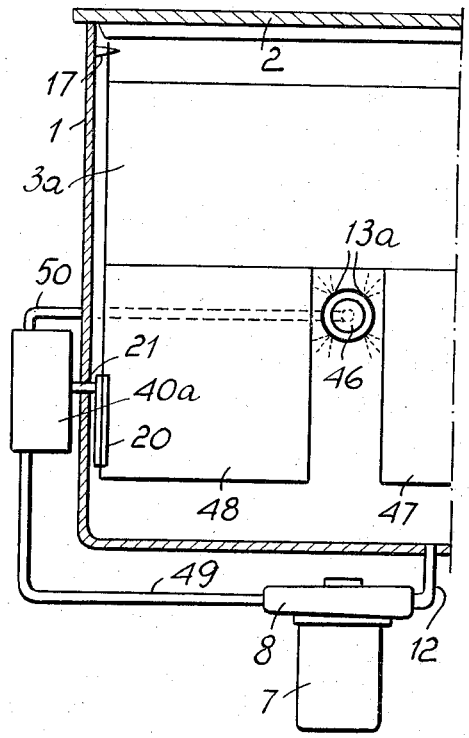

The dishwasher illustrated in FIGS. 1 and 2 includes a tank 1, closed by a cover 2, and containing the basket or the basket unit 3, wherein are arranged the dishes to be washed. The bottom wall of the tank 1 has a small bottom cup 6, containing the mouth of the feed pipe 4 for the washing water, the drain pipe 16 in which there is inserted the pump 15, and the suction pipe 12 of the pump 8, driven by the motor 7, which drives also the hollow rotating shaft 9, extending into the cup 6 and carrying the member or distributor 11, carrying the nozzles 13 for the washing spouts or sprays.

The shaft 9 extends into the cup 6 through a sealing packing 10, and in its portion outside the tank 1 has in a suitable position a worm screw 29, meshing with a worm wheel 30, keyed on the shaft 31, which, through two pairs of bevel gears 32 and 33 and the shaft 34, causes the rotation of the shaft 21 having an eccentric 20, causing the oscillatory movement of the dish carrying basket 3.

In the dishwasher illustrated in FIGS. 1 and 2, the water spouts unit that is the member 11, rotates while the basket 3 performs, according to the invention, an oscillatory movement caused, as stated above, by the eccentric 20, revolving between two guides 22, fast with the basket 3, and which end downwardly tapered surfaces 23 in order to facilitate the insertion of the eccentric 20, when the basket 3, which is removable, is again placed in the machine. The basket, in order to perform said oscillatory movement, is hung on pivots 17, carried by the tank 1 wall.

The operation of the dishwasher as described above is the following:

When it is desired to operate the machine, the dishes to be washed are suitably arranged in the basket 3, and same is introduced in the tank 1, which is then closed by the cover 2. Through the pipe 4, controlled by the electrovalve 5, the washing water at the specified temperature may be fed to the machine and, in the types supplied with cold water, there will be provided electric resistors, arranged according to already known and adopted patterns in many machines of this kind, which heat the water collected in the cup 6 to the desired temperature, before the washing is started. When the water, in the desired quantity and at the desired temperature, is collected in the cup 6, with one of the devices usually adopted in such machines, with the water there is mixed the suitable detergent, in the required quantity. Then begins the washing cycle, and the motor 7 starts to rotate driving the pump 8 and the hollow shaft 9, together with the distributor 11, and the water pressurized by the pump 8 flows out through the rotating nozzles 13, striking the dishes arranged in the basket 3. Upon rotation of the shaft 9 however, there are also caused to rotate the gear 30, the shaft 31, the pair of bevel gears 32, the shaft 34, the other pair of bevel gears 33 and the shaft 21, the transmission ratios through the gears being such that the eccentric 20, mounted on the shaft 21, will rotate at a suitable, predetermined speed, so as to cause the basket 3 to perform oscillations, and in FIG. 1 there are shown respectively in thin continuous lines and in dash lines the utmost positions 18 and 19, respectively, that the basket 3 takes up during its oscillation, actuated by the eccentric 20 acting on the shoulders or guides 22.

Looking again to FIG. 1, it can be seen then how a dish, as for instance shown with 25 which, at the basket in the vertical position, is struck by a water spout from a nozzle 13, at a certain point and at a certain angle, when the dish 25 is in the position 26, corresponding to the maximum excursion to the right (looking at FIG. 1) of the basket 3, will be struck by the same spout at a different angle, when the dish 25 has reached the position shown at 27, corresponding to the extreme left position, shown at 19, of the basket 3. In addition one sees how these spouts thrown back by the dish 25, will take different paths, shown at 28 in FIG. 1, so that even the dishes that are placed above the dish 25, that is in the upper portion of the basket 3 will be struck, thanks to the basket oscillation, with different impact angles depending upon the position taken up by the basket itself at each instant because of its oscillatory movement.

When the washing cycle is ended, the motor 7 stops and all the water collects in the cup 6; then the electric motor driven pump 15 is started and discharges the dirty water through the pipe 16, while the dishwasher remains ready for washing another batch of dishes that will be arranged in the basket 3, after having removed from same the dishes previously washed and dried.

According to a variant, the shaft 9 is stationary, and the distributor 11 is mounted thereon, by means of the hub 14 which will rotate together with the distributor 11 because of the reaction effect from the pressurized water flowing out from the orifices 13, suitably arranged and inclined.

According to another variant, the distributor 11 is made to rotate by the shaft 9, and has no nozzles, but has a profile adapted to hurl violently upwardly the water collected in the cup 6.

Of course many other variants are possible in the machine just described and illustrated in FIGS. 1 and 2; in particular, the transmission system for the rotational drive of the eccentric 20 may be provided, instead of by the shafts 31, 34 and 21 and the corresponding gears, by a flexible rotating shaft connecting directly the gears 30 to the eccentric shaft 21. Said eccentric may also be directly driven from the small electric motor 35, through a speed reducer 36, that actuates the shaft 21 with the eccentric 20, as shown in FIG. 3.

FIG. 4 illustrates another variant according to which the dishwasher will be equipped, not only with the nozzles 13 of the rotating distributor 11, but also with additional upper sprayers 37. In this instance, from the pipe 9, coming from the pump, by means of a suitable connection 38, there can be branched off a small amount of pressurized water that is conveyed by pipe 39 to the small hydraulic engine 40 which, through a suitable speed reducer, will cause the shaft 21, and therefore also the eccentric 20, to rotate at the desired speed. Then, the water that has actuated the hydraulic engine 40, through the pipe 41, is carried to the additional nozzle or nozzles 37, and thrown again with force on the dishes to be washed.

FIGS. 5 and 6 illustrate variants of the basket suspension system in the machine tank 1. According to the variant of FIG. 5, the suspension is obtained by means of two straight guides 42, fixed on the machine housing 1, and on which rests the basket upper edge 43, which in this instance will have the shape of a circular arc.

In the FIG. 6 variant, the machine is provided with two curved guides 44, fixed on the machine housing 1, and on which rests the upper straight protruding edge 45 of the basket 3. Also in these two different suspension methods, the basket 3 can oscillate between two utmost positions, such as those respectively shown at 18 and 19 in FIG. 1.

FIGS. 7 and 8 are two vertical and mutually perpendicular sections of another embodiment of a dishwasher according to the invention, wherein the pressurized water flows from the orifices 13a, provided in a horizontal pipe 46, caused to rotate by a mechanical drive, or by the reaction of the pressurized water flowing from the orifices 13a, suitably arranged and inclined.

In this as well as in the other figures showing other embodiments, like elements are shown with the same reference numerals, and, in the case of FIGS. 7 and 8, the basket and the nozzles which are similar, but slightly different from the preceding ones, are shown with the same reference numerals, followed by the letter a.

In this type of machine, the basket 3a is divided, in its lower portion, in two half baskets 47 and 48, that depend astride the water spraying pipe 46. The basket assembly, even with this arrangement, oscillates, and therefore it is suspended either by means of pivots 17, or with one of the other systems already considered, or other easily conceivable ones.

The rotation of the eccentric 20, rigidly mounted on the shaft 21, may be obtained by one of the means previously illustrated, or the eccentric can be driven by a small hydraulic engine 40, through an appropriate speed reducer, inserted in the pipes 49 and 50, carrying the pressurized water from the pump 8 to the nozzle pipe 46, as clearly illustrated in FIG. 8.

The operation of this type of dishwasher is absolutely similar to that of the embodiment previously considered, and therefore it will not be described in detail now.

An additional variant is possible, in practically all the embodiments of the dish washing machines according to the present invention.

According to said variant, the dishwasher is provided with two or more dish carrying baskets, independent from one another, only one of which is provided with the oscillatory movement characteristic of the present invention.

The advantages offered by a dishwashing machine according to the present invention, and of which there have now been described and shown in the drawings several embodiments, are easily understood and evident to anybody acquainted with these machines and familiar with the problems and difficulties that the proper operation of a dishwashing machine presents.

Of course the embodiments and the details described above and illustrated may be subjected to changes easily conceivable by those skilled in this art; all such variants will however fall within the scope of the present invention.

What I claim is:

1. A dishwashing machine comprising at least one basket adapted to support dishes in spaced relationship, means mounting the basket for oscillatory swinging movement, jet means for applying cleaning fluid to dishes in the basket, means mounting the jet means for cyclic movement in a closed path, said jet means comprising a group of nozzles, a rotating member by which said nozzles are carried, a washing tank encompassing said basket, a motor disposed outside said washing tank for rotating said nozzles, a pump driven by said motor for supplying cleaning liquid to said nozzles, said basket-mounting means comprising means mounting said basket for vertical swinging movement about a horizontal axis disposed near the top of the basket, and means for oscillating the basket and for moving the jet means about said closed path with a frequency of oscillation of said basket which is distinctively different from the frequency of cyclic movement of said jet means so that the cleaning fluid from the jet means impinges on the dishes at continuously different impact angles, said means for oscillating the basket comprising a rotatable eccentric and two parallel guides secured to the basket and between which said eccentric is rotatably disposed.

2. A dishwashing machine as claimed in claim 1, said jet means comprising a horizontal pipe having a plurality of openings through the side walls thereof, and means for rotating said pipe about its axis.

3. A dishwashing machine as claimed in claim 2, said basket being oscillatable about a horizontal axis parallel to said pipe.

4. A dishwashing machine as claimed in claim 3, said basket being divided into two half baskets disposed on opposite sides of said pipe.

5. A dishwashing machine as claimed in claim 1, said means mounting said basket for oscillatory movement comprising stationary pivot means, and guide means carried by said basket and resting on said stationary guide means, one of said guide means and pivot means having an arched profile and the other of said guide means and pivot means having a straight profile, the convex side of the arched profile being disposed against said straight profile.

References Cited
UNITED STATES PATENTS

| | | | |
|---|---|---|---|
| 1,447,305 | 3/1923 | Hauk | 134—140 |
| 1,633,803 | 6/1927 | Ballin | 134—144 |
| 2,194,607 | 3/1940 | McDevitt | 134—141 |
| 2,426,291 | 8/1947 | Abrams | 134—144 |
| 2,734,520 | 2/1956 | Abresch et al. | 134—58 |
| 3,227,166 | 1/1966 | Martz | 134—161 |

CHARLES A. WILLMUTH, *Primary Examiner.*

R. L. BLEUTGE, *Assistant Examiner.*